Figure 1:
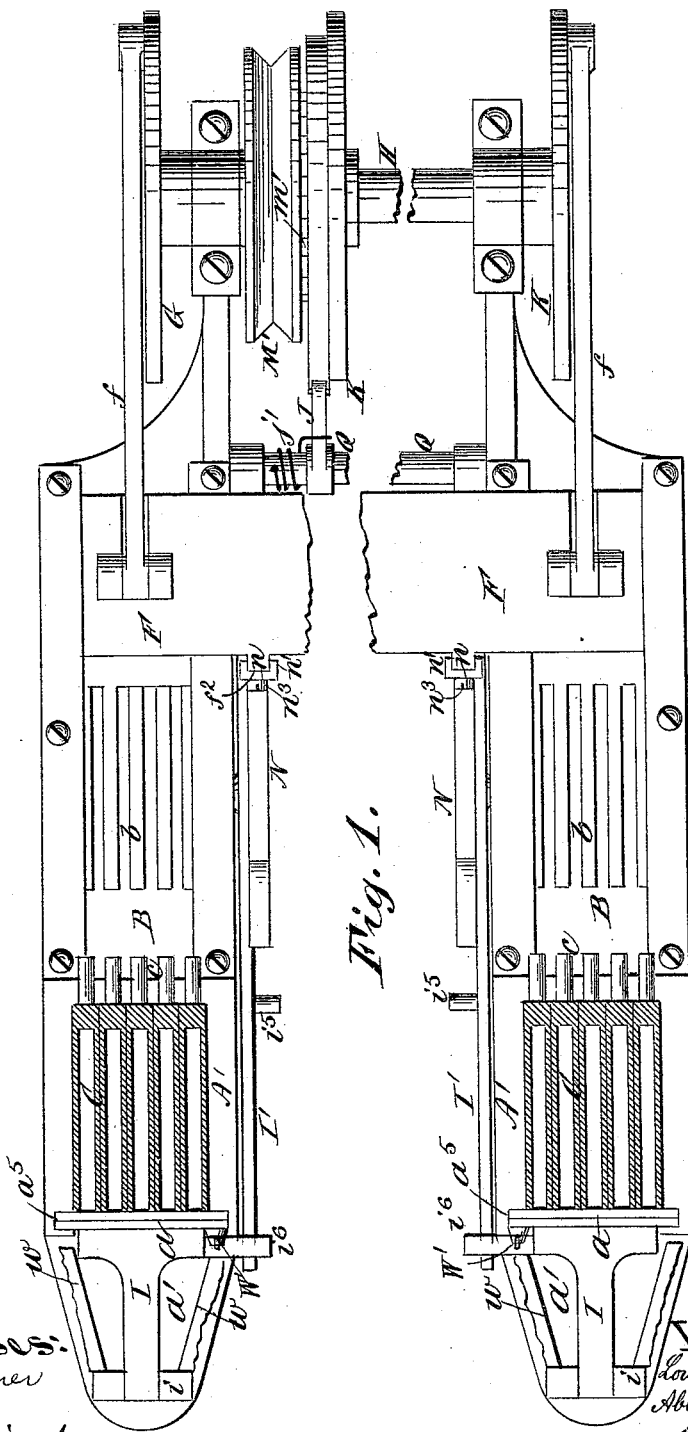

(No Model.) 7 Sheets—Sheet 1.

L. K. JOHNSON & A. A. LOW.
TYPE SETTING APPARATUS.

No. 529,447. Patented Nov. 20, 1894.

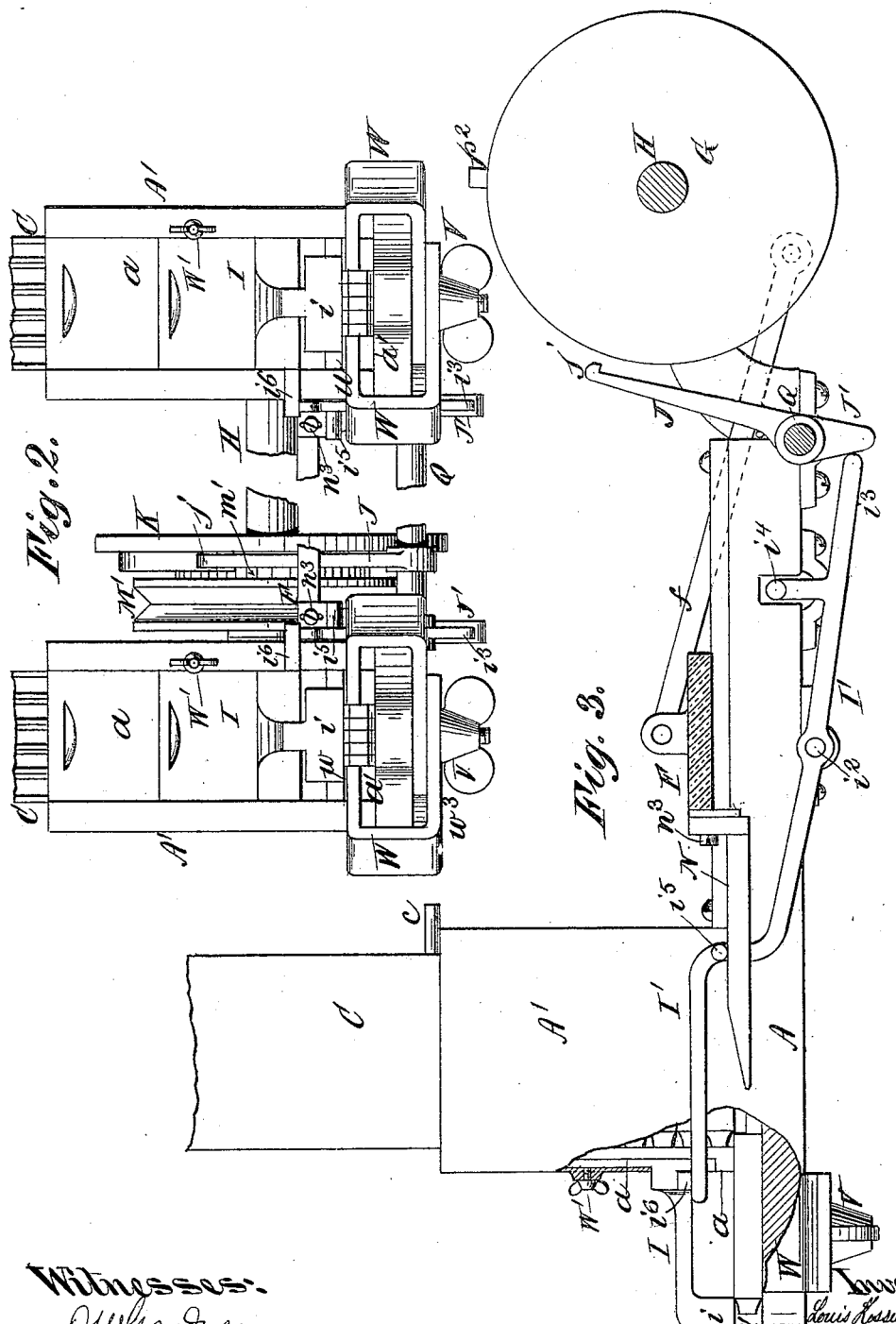

(No Model.) 7 Sheets—Sheet 3.
L. K. JOHNSON & A. A. LOW.
TYPE SETTING APPARATUS.
No. 529,447. Patented Nov. 20, 1894.
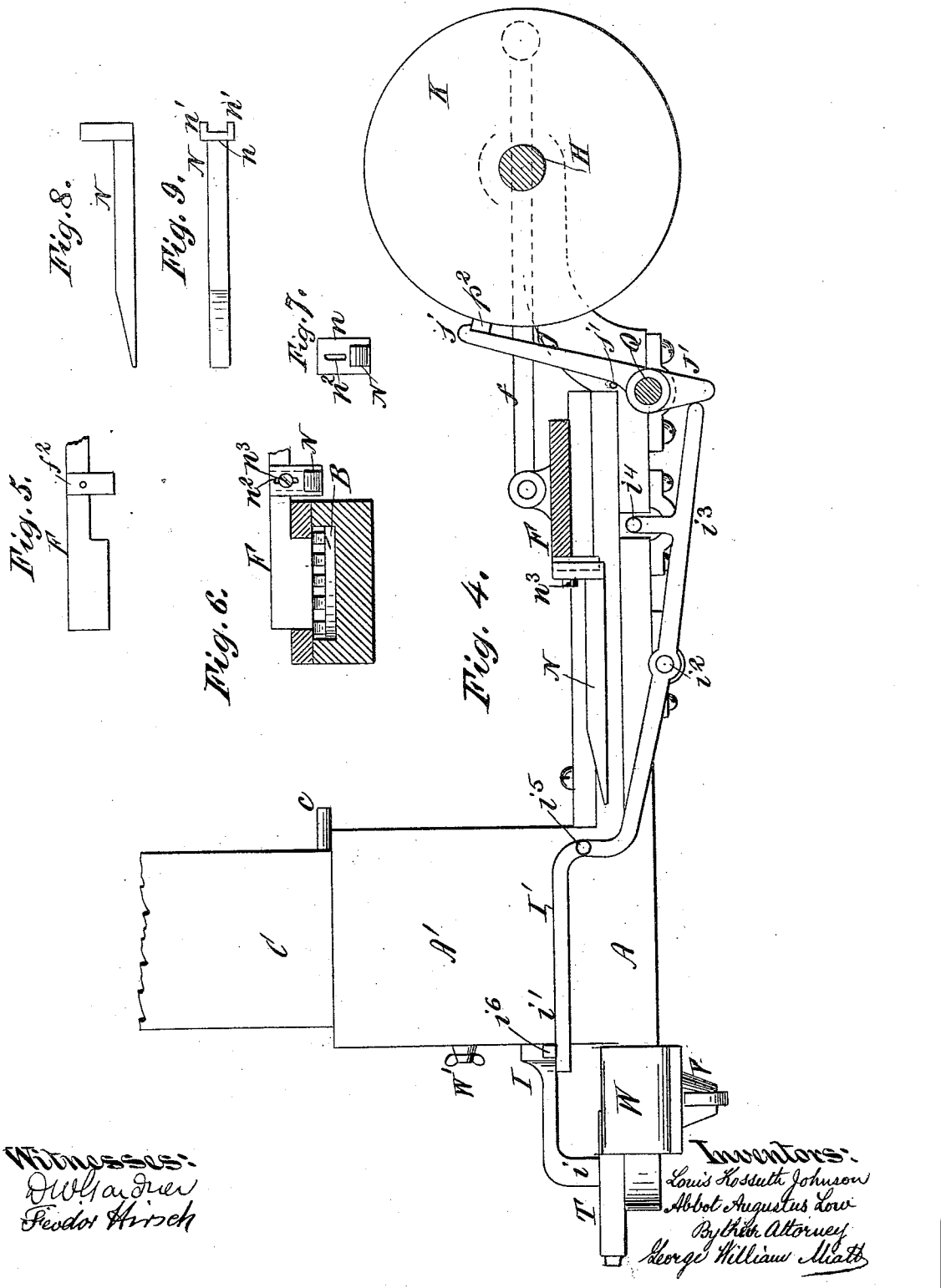

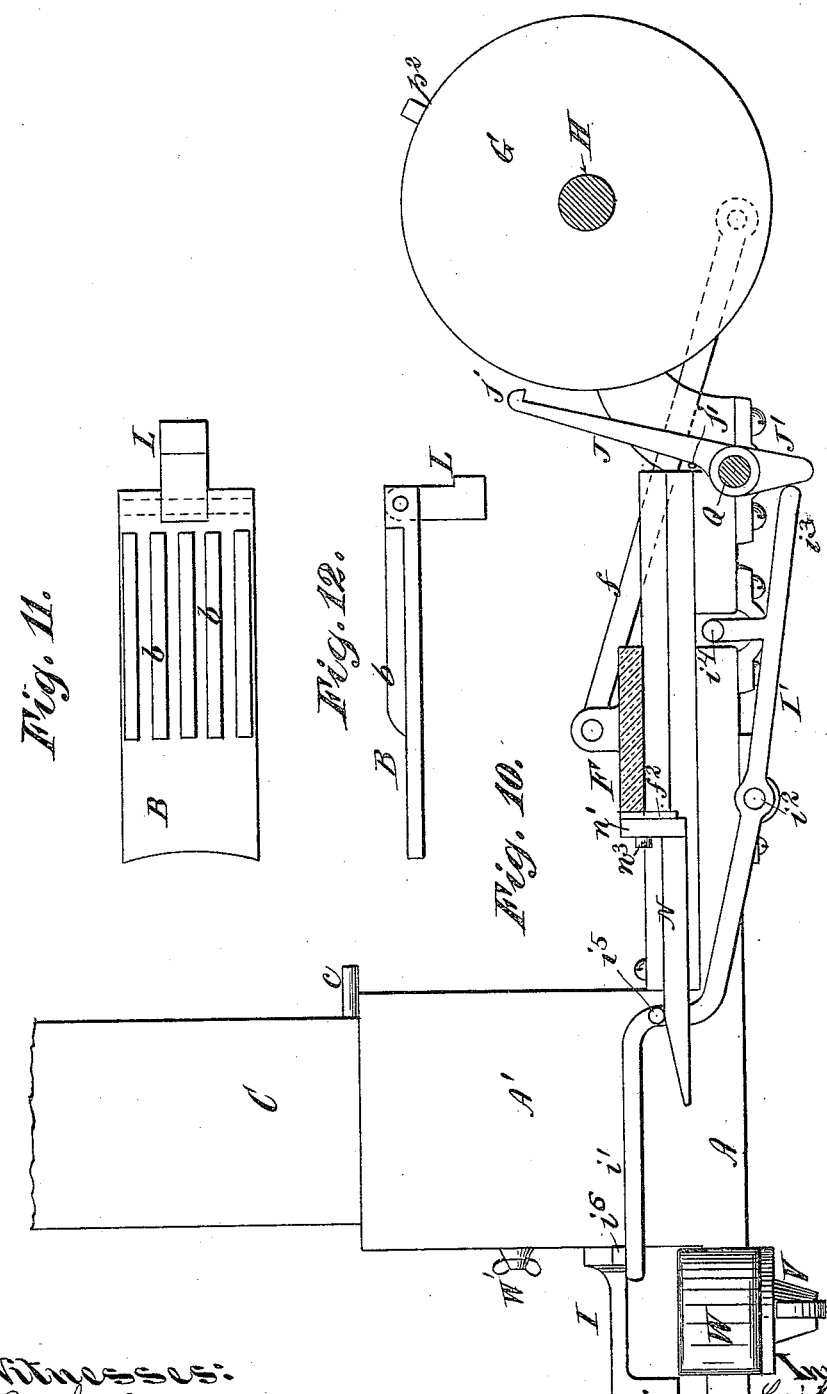

(No Model.) 7 Sheets—Sheet 5.
L. K. JOHNSON & A. A. LOW.
TYPE SETTING APPARATUS.
No. 529,447. Patented Nov. 20, 1894.
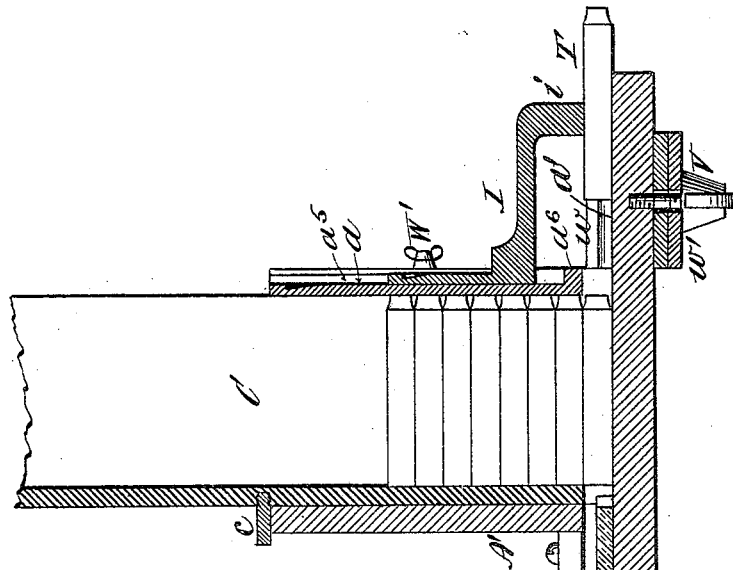
Fig. 13.
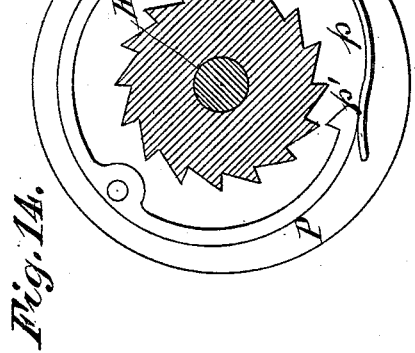
Fig. 14.
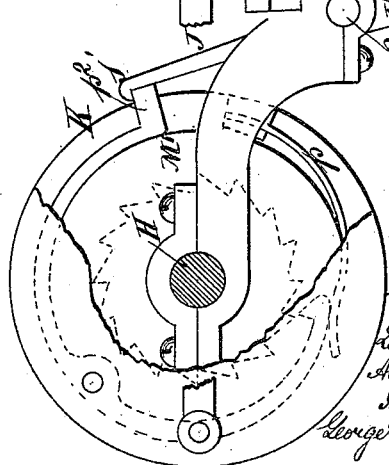

(No Model.) 7 Sheets—Sheet 6.

L. K. JOHNSON & A. A. LOW.
TYPE SETTING APPARATUS.

No. 529,447. Patented Nov. 20, 1894.

(No Model.) 7 Sheets—Sheet 7.
L. K. JOHNSON & A. A. LOW.
TYPE SETTING APPARATUS.
No. 529,447. Patented Nov. 20, 1894.
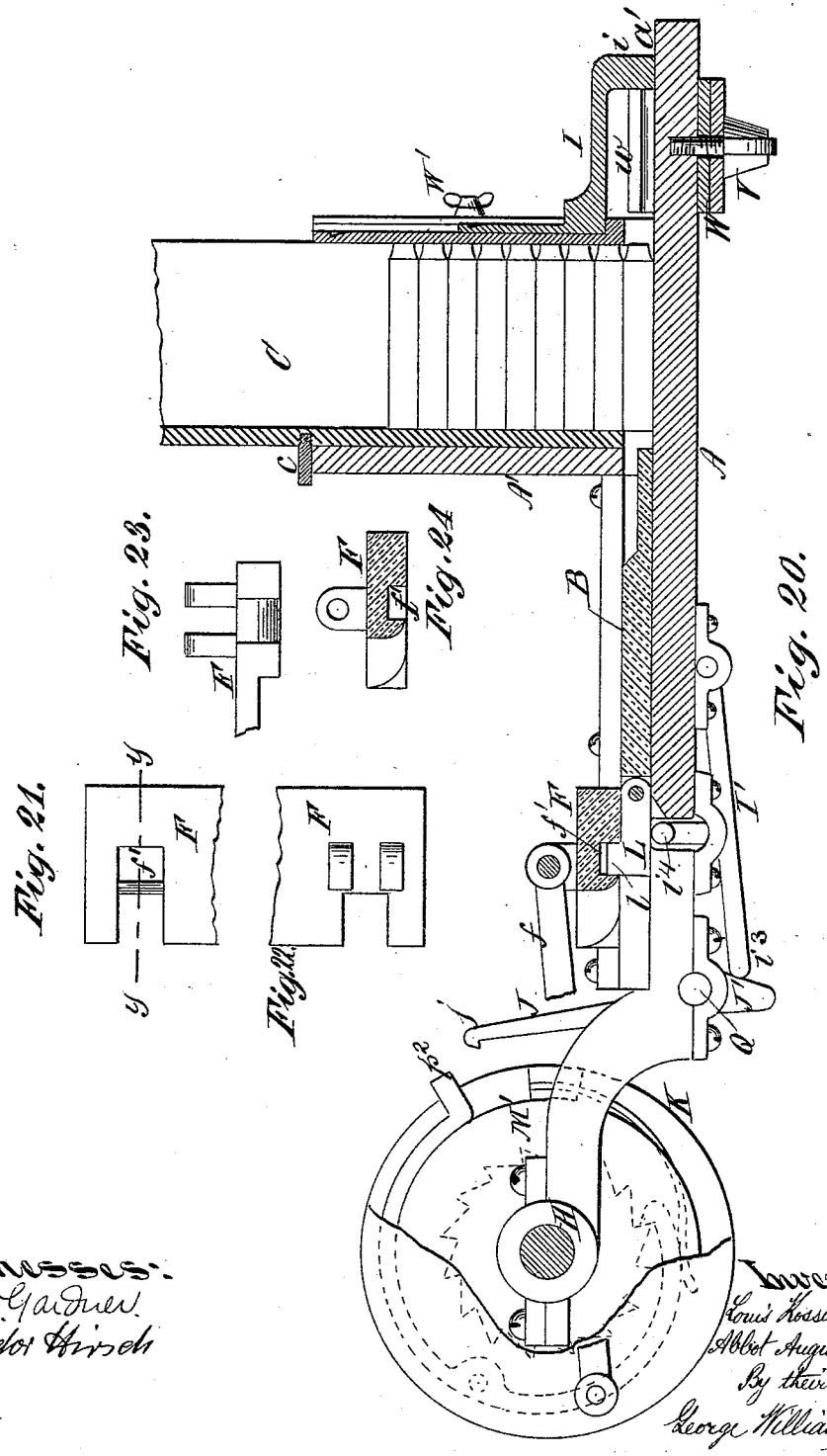

UNITED STATES PATENT OFFICE.

LOUIS KOSSUTH JOHNSON AND ABBOT AUGUSTUS LOW, OF BROOKLYN, ASSIGNORS TO THE ALDEN TYPE MACHINE COMPANY, OF NEW YORK, N. Y.

TYPE-SETTING APPARATUS.

SPECIFICATION forming part of Letters Patent No. 529,447, dated November 20, 1894.

Application filed April 9, 1894. Serial No. 506,876. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Apparatus, of which the following is a description sufficient to enable others skilled in the art to which the invention appertains to make and use the same.

Our improvements relate to the class of type setting apparatus in which the types are arranged in prescribed positions with relation to each other in type containing channels from the lower ends of which they are successively forwarded into position to be grasped by the fingers of the compositor, for removal to the stick.

In our last application, Serial No. 505,399, filed March 28, 1894, we show means for relieving the types of the duty of raising the controlling lever during their advance, in such manner that the types simply support the controlling lever in its elevated position when they are fully advanced and in position for removal, their withdrawal allowing the forward end of the controlling lever to drop and throw into action the type forwarding mechanism. In our present application the same result is accomplished in connection with a reciprocating forwarding bar which is brought into action only upon the withdrawal of the types from any one of a series of type holders and platforms, the controlling lever as it drops not only coupling the type forwarding plate to the reciprocal bar but also tripping the device which holds the clutch upon the rotating mechanism, thereby causing the said reciprocal bar to advance and recede once before the trip again catches the clutch and stops the operation until other types are removed from any of the type platforms. Only a single clutch and trip are used for a series of type channel holders, the trip being actuated by any one of the individual type controlling levers. The advantage of this arrangement is that all the parts are at rest excepting when actually in use, and the wear and tear avoided.

Another distinguishing feature of our present invention consists in the use of an independent type holder for sustaining the types in their forward position as they project over the front of the type platform, said type holder being raised by the controlling lever during the forward stroke of the type forwarder to allow the types to pass under, but actuating the controlling lever so as to couple the forwarding plate to the vibratory bar and to release the power clutch when the types are withdrawn from under the said holder. This type holder bears upon the types beyond or in front of the converging side walls or guides which centralize the types as they advance before the type forwarding plate. Provision is made for securing this type holder in an elevated position above the type platform when desirable, as when it is necessary to have access to the lower ends of the channels without removing them from their holders, &c.

Still another feature of our present invention consists in making the converging side walls freely adjustable with relation to each other horizontally, both as to distance and inclination.

In our present application we show and describe means substantially similar to those set forth in our last application hereinbefore referred to for raising the type holder and sustaining it while the advancing types pass under it.

Our present invention in this respect consists in making the raising and holding device adjustable vertically upon the vibratory bar for the purpose of adapting the device to different fonts or widths of types.

The invention is shown in the accompanying drawings, and is herein described, as applied to type forwarding mechanism similar to that shown in our last application hereinbefore referred to, in which a plurality of type containing channels are supported in such relation to each other that a single pusher plate forwards a word or combination of letters which are made to converge and come together into position to be simultaneously grasped and removed by the fingers of the compositor.

Our invention is equally applicable to mechanism for separating and forwarding types singly, and we do not confine ourselves in the use of the device, as herein set forth, to a plurality of type containing channels arranged in groups.

In the accompanying drawings, for convenience of illustration, we show our improvements as applied practically and operatively in connection with two channel holders, platforms, &c., which represent those at the opposite ends of a bank or line of such devices, the intermediate holders, &c., being omitted.

Figure 15:
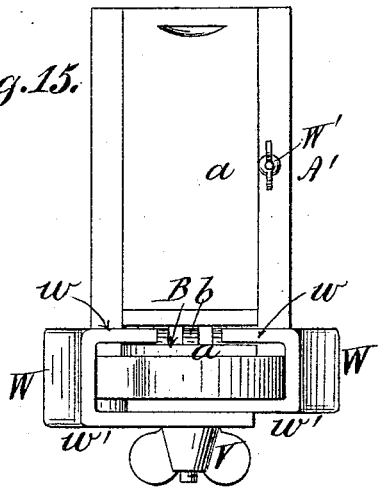
Figure 16:
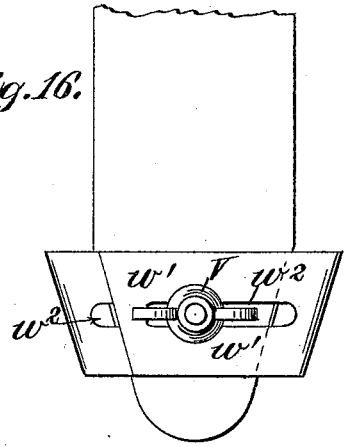
Figure 17:
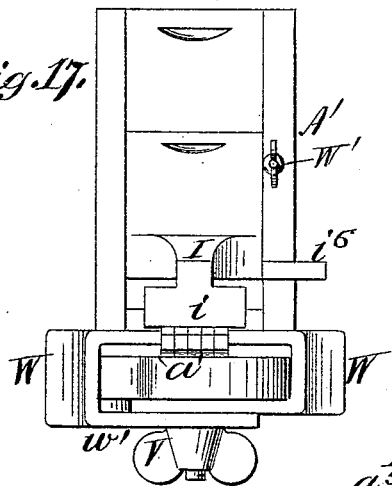
Figure 18:
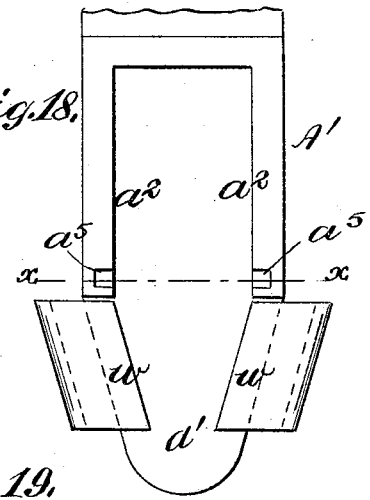
Figure 19:
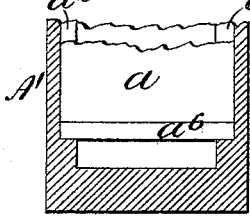

In the accompanying drawings, Figure 1, is a top view; Fig. 2, a front elevation; Fig. 3, a sectional elevation looking toward the left hand side. Fig. 4, is a similar view showing the parts at rest. Fig. 5, is a front elevation of the left hand end of the vibratory bar, removed; Fig. 6, a similar view of that end of the bar in position, and showing the lifter applied thereto. Fig. 7, is a front elevation of the lifter itself. Fig. 8, is a side elevation thereof; Fig. 9, a top view thereof. Fig. 10, is a side elevation showing the parts as the lifter is brought into engagement with the controlling lever. Fig. 11, is a top view of the type forwarding plate. Fig. 12, is a side elevation thereof. Fig. 13, is a central vertical sectional elevation of the left hand holder and platform, showing the parts at rest. Fig. 14, is a detail of the clutch mechanism. Fig. 15, is a front elevation of a channel holder and type platform, the type holder for the advanced types being omitted. Fig. 16, is a view of the under side of the forward end of the type platform. Fig. 17, is a front elevation similar to Fig. 15, showing the type holder in position. Fig. 18, is a top view of the holder and platform with the front plate and type holder removed. Fig. 19, is a vertical section on plane of line $x, x$, Fig. 18, showing the lower end of the front plate in position. Fig. 20, is a sectional elevation similar to Fig. 13, showing the parts immediately after the withdrawal of the types and the release of the clutch. Fig. 21, is a view of the under side of the left hand end of the vibratory bar; Fig. 22, a top view of the same; Fig. 23, a rear view thereof; Fig. 24, a section upon plane of line $y, y$, Fig. 21.

In the drawings A, represents portions of the stationary frame or support of suitable construction. Each channel holder A', consists of a socket piece of rectangular form, adapted to hold a plurality of channels, those shown in the drawings accommodating five type containing channels C, each, said type containing channels resting against each other and being suspended by pins $c, c$, projecting from the spines of the channels, which pins $c$, rest upon the upper edges of the sockets A. The front of the socket piece A', is in each case closed by a flat guard $a$, which locks in the channels and the lower portions of the columns of type contained therein.

$a', a'$, are the type supporting platforms upon which the lowest types in the several columns rest.

$a^2, a^2$, are the parallel side walls of the holders A', A'.

The converging side walls which act similar to those heretofore shown and described by us consist in the present case of the edges $w, w$, of the plates W, W. These plates W, W, are formed with flanges $w', w'$, which extend underneath the type platforms $a'$, where they are secured by set screws V. The flanges $w', w'$, are formed with the slots $w^2$, so as to allow the plates W, W, to be adjusted with relation to each other and to the type containing channels. The upper flanges $w, w$, extend over the type platform $a'$, and a sufficient distance above its upper surface to admit the forward end of the pusher plate B, as shown in Fig. 15. It will be seen that the plates W, W, being held in each case by a single set screw V, may readily be adjusted in inclination with relation to each other if desired. This adjustment of the converging side walls, is for the purpose of adapting the device to channels and types of various widths or sizes, or to the use of fewer number of type containing channels in a holder.

By reference to Figs. 11 and 12, more particularly, it will be seen that the pusher B, consists of a flat plate formed with ribs $b, b$, upon its upper surface. The side walls of the channels extend down nearly to the level of the upper surface of the plate B, the lower ends of their spines being notched to admit of the passage of the ribs $b$, upon the pusher B. Pivotally connected to the rear of the pusher plate, B, is the latch L, which tends constantly to swing downward into the position shown in Fig. 12.

The reciprocating forwarder F, which is actuated through the medium of the pitman $f$, by the disk crank G, whenever the latter is rotated by the shaft H, is formed with a recess $f'$, in its under side adapted to receive the tongue $l$, of the latch L, when the plate B, and the forwarder F, are brought into proper relation to each other. This occurs at the end of the retractile stroke of the forwarder F, as illustrated in Figs. 13 and 24. If there are types T, in position on the front of the type platform $a'$, the bearing $i$, upon the forward end of the holder I, is held up by them away from the type supporting type platform $a'$, as shown in Figs. 4, 13, and 17. When the types are removed the holder I, drops until the bearing $i$, rests against the type platform, as shown in Fig. 24. As the holder I, drops it depresses the outer end $i'$, of the controlling lever I', thereby rocking said lever on its pivot $i^2$, and elevating the rear $i^3$, of the lever. The elevation of the inner end $i^3$, of the lever I', causes the arm $i^4$, to raise the latch L, so that its tongue $l$, enters into the recess $f'$, in the under side of the forwarding bar F, as shown in Fig. 24. Simultaneously the raising of the inner end $i^3$, of the lever I', rocks the lever J', so that the clutch K, is released, and the shaft M, commences to rotate. Thus it will be seen that as the forwarding bar F, starts forward immediately, the latch L, is carried forward with it onto the horizontal floor surface $a^{11}$, thereby insuring the locking together of the forwarder F, and the plate B, until the end of the retractile stroke of the forwarder F.

During the forward stroke of the reciprocating bar F, and of the type forwarding plate B, the controlling lever I', is again raised by the lifter N, projecting forward from the reciprocating bar L. During the forward stroke, and just prior to the time when the faces of the type reach the holder bearing $i$, the forward end of the lifter N encounters and raises the stud $i^5$, on the outer arm of the controlling lever I', thus raising the holder I, above and out of contact with the types. As the forwarder F, recedes, the lifter N, recedes from under the stud $i^5$, allowing the bearing $i$, to rest upon the type, as hereinbefore stated. It will thus be seen that the faces of the types do not encounter the holder I, and there is no friction between the types and said holder excepting possibly during the withdrawal of the types from the type platform by the fingers of the operator. As the reciprocating bar F, and the type forwarding plate B, reach the end of their retractile movement the latch L, drops down again, withdrawing the tongue $l$, from the recess $f'$, in the forwarder F, in which position it will remain until the removal of the types T, again allows the holder I, to depress the forward end of the controlling lever I', to thereby raise the latch L, into the horizontal position and to release the clutch.

The pulley M', is secured to the ratchet wheel $m'$, and they are both mounted loosely upon the shaft M, and rotate continuously thereon. The disk K, is secured rigidly to the shaft H, and carries the pawl P, which tends constantly to engage with the ratchet $m'$, by reason of the pressure of the spring $p$. The shoulder $p'$, of the pawl P is however held out of engagement with the teeth of the wheel $m'$, when the apparatus is not in use, by the shoulder $j$, upon the upper end of the lever J, situated upon the rock shaft Q. A spring $j'$, shown clearly in Fig. 1, tends constantly to rock the lever J, backward into such position that the shoulder $j$, will engage with the projecting end $p^2$, of the pawl P, whenever the rotation of the disk G brings the said end $p^2$, into coincidence therewith.

The rock shaft Q, extends the length of the apparatus, and is provided with as many short arms J', as there are type platforms, they being so situated individually as to rest against the inner end of one of the type controlling levers I'. Hence the depression of the forward end of any one of said controlling levers will rock the shaft Q, releasing the end $p^2$, of the pawl P, from the arm J, and allowing the spring $p$, to throw the point $p'$, of the pawl P, into engagement with the ratchet $m'$. As a result the shaft M, is made to rotate with the pulley M', and the pawl $m'$ thereby causing the crank disk G and pitman $f$, to reciprocate the forwarder F. As the latter advances the finger N, raises the controlling lever I', as hereinbefore stated, thereby depressing the inner end of said lever and allowing the spring $j'$, to throw the arm J, back into position to engage with the end $p^2$, of the pawl P, which it does at the completion of the first revolution of the disk K, thereby rocking the pawl P, out of engagement with the ratchet $m'$, and locking the rock shaft Q until it is again rocked by the removal of types from one of the platforms.

Both the front plate $a$, and the holder I, slide vertically in the grooves $a^5$, plate $a$, being formed with a shoulder $a^6$, at the bottom which engages with the under side of the holder I when the plate $a$, is raised, thereby enabling both the plate $a$, and the holder I, to be removed together or raised sufficiently to get access to the lower ends of the channels when necessary; or if desired the holder I, may be raised independently. The holder I, is formed with a lateral projection $i^6$, which rests on top of the outer end $i'$, of the controlling lever I'. The front of the type platform is thus left free, so that when the holder I and plate $a$, are raised or removed access to the holder A', from the front thereof, will be unobstructed.

The lifter N, is adjustable vertically upon the reciprocating bar F, by any suitable means. As shown in the drawings it is formed with a plate $n$, having flanges $n'$, which clasp the stud $f^2$. The plate $n$, being formed with the vertical slot $n^2$, through the set screw $n^3$, enters to clamp the lifter N, to the bar F. This adjustment is for the purpose of setting the apparatus with accuracy to the work to be done, and also to compensate for variations in the widths of the fonts of type that may be used in the apparatus.

A set screw W', or equivalent device is arranged upon the holder A', for the purpose of holding the face plate $a$, and the holder I, in an elevated position when desired, to give access to the lower ends of the type channels.

What we claim as our invention, and desire to secure by Letters Patent, is—

1. In type setting apparatus the combination of one or more type containing channels, a type platform, a type forwarding plate resting upon said platform and formed with a latch, a reciprocating pusher bar, means for reciprocating said pusher bar, and a controlling lever for simultaneously releasing the reciprocating mechanism and throwing the latch of the type forwarding plate into engagement with the reciprocating bar, substantially in the manner and for the purpose described.

2. In type setting apparatus the combination of one or more type containing channels, a type platform, a type forwarding plate resting upon said platform and formed with a latch, a reciprocating pusher bar, means for reciprocating said pusher bar, a controlling lever for simultaneously releasing the reciprocating mechanism and throwing the latch of the type forwarding plate into engagement with the reciprocating bar, and a sliding weight resting against the forward end of the said controlling lever, for the purpose and substantially in the manner described.

3. In type setting apparatus the combination of one or more type containing channels, a type platform, a type forwarding plate resting upon said platform and formed with a latch, a reciprocating pusher bar, means for reciprocating said pusher bar, a controlling lever for simultaneously releasing the reciprocating mechanism and throwing the latch of the type forwarding plate into engagement with the reciprocating bar, and a sliding weight resting against the forward end of the said controlling lever the said weight being formed with a type bearing arm, substantially in the manner and for the purpose described.

4. In type setting apparatus substantially such as described, the combination of the type platform formed with converging side walls for centralizing the types as forwarded by the pusher, and a type holder bearing against the types beyond the said converging side walls, substantially in the manner and for the purpose described.

5. In type setting apparatus, the combination of a series of type platforms and holders each provided with a type forwarding plate and controlling lever, a reciprocating bar common to all, means for reciprocating said type bar, a rock shaft common to all formed with a lever for locking and unlocking the reciprocating mechanism and with arms which are in contact with the several controlling levers, for the purpose and substantially in the manner described.

6. In type setting apparatus such as described the combination with the reciprocating forwarding bar, and with the controlling lever, of a vertically adjustable lifter upon the reciprocating bar, arranged and operating substantially in the manner and for the purpose set forth.

7. In type setting apparatus such as described, the combination with the type platform, and with the channel holder, of a face plate formed with a shoulder at its lower edge, and of a sliding type holder, arranged and operating substantially in the manner and for the purpose described.

8. In type setting apparatus such as described, the combination of a type platform, the channel holder formed with vertical grooves, the face plate, the vertically sliding type holder, and a device for holding the said type holder and face plate in a raised position, for the purpose and substantially in the manner described.

9. In type setting apparatus such as described, the combination of a type platform, the channel holder, a type forwarding plate, and converging side walls raised above the type platform to allow the forward end of the type forwarding plate to pass under them, substantially in the manner and for the purpose described.

LOUIS KOSSUTH JOHNSON.
ABBOT AUGUSTUS LOW.

Witnesses:
GEORGE WILLIAM MIATT,
D. W. GARDNER.